United States Patent
Budovski et al.

(10) Patent No.: US 11,567,839 B2
(45) Date of Patent: *Jan. 31, 2023

(54) SNAPSHOT-BASED DATA CORRUPTION DETECTION

(71) Applicant: Microsoft Technology Licensing, LLC, Redmond, WA (US)

(72) Inventors: Alexander Budovski, Boonville, MO (US); Cristian Diaconu, Kirkland, WA (US); Sandeep Lingam, Redmond, WA (US); Alejandro Hernandez Saenz, Kirkland, WA (US); Naveen Prakash, Sammamish, WA (US); Krystyna Ewa Reisteter, Kirkland, WA (US); Rogerio Ramos, Redmond, WA (US); Huanhui Hu, Redmond, WA (US); Peter Byrne, Charlotte Hall, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,337

(22) Filed: Oct. 27, 2021

(65) Prior Publication Data
US 2022/0342778 A1 Oct. 27, 2022

Related U.S. Application Data

(63) Continuation of application No. 17/237,707, filed on Apr. 22, 2021, now Pat. No. 11,249,866.

(51) Int. Cl.
| | | |
|---|---|---|
| G06F 11/07 | (2006.01) | |
| G06F 11/14 | (2006.01) | |
| G06F 11/00 | (2006.01) | |

(52) U.S. Cl.
CPC ........ *G06F 11/1471* (2013.01); *G06F 11/006* (2013.01); *G06F 11/1446* (2013.01); *G06F 2201/84* (2013.01)

(58) Field of Classification Search
CPC . G06F 11/006; G06F 11/1446; G06F 11/1471
(Continued)

(56) References Cited

U.S. PATENT DOCUMENTS 9,158,633 B2 * 10/2015 Bish .................... G06F 11/1471
9,753,932 B1    9/2017 Brow et al.
(Continued)

FOREIGN PATENT DOCUMENTS

CN    111868689 A   * 10/2020   ............. G06F 11/08

OTHER PUBLICATIONS

"International Search Report and Written Opinion Issued in PCT Application No. PCT/US21/055338", dated Feb. 16, 2022, 10 Pages.

*Primary Examiner* — Chae M Ko
(74) *Attorney, Agent, or Firm* — Fiala & Weaver P.L.L.C.

(57) ABSTRACT

Embodiments described herein detect data corruption in a distributed data set system. For example, a system comprises node(s) for processing queries with respect to a distributed data set comprising a plurality of storage segments. A write transaction resulting from a query with respect to a particular storage segment is logged in a log record that describes a modification to the storage segment. A log service provides the log record to a data server managing a portion of the distributed data set in which the storage segment is included, which performs the write transaction with respect to the storage segment. For redundancy purposes, the data server has replica(s) that manage respective replicas of the portion of the distributed data set managed thereby. For backup purposes, snapshots of the replica(s) are periodically generated.

(Continued)

erated. To determine a data corruption, a snapshot of one replica is cross-validated with a snapshot of another replica.

20 Claims, 7 Drawing Sheets

(58) Field of Classification Search
 USPC .................................................. 714/1, 15, 20
 See application file for complete search history.

(56) References Cited

U.S. PATENT DOCUMENTS

| | | |
|---|---|---|
| 2014/0279900 A1 | 9/2014 | Gupta et al. |
| 2014/0324785 A1 | 10/2014 | Gupta et al. |

* cited by examiner

SNAPSHOT-BASED DATA CORRUPTION DETECTION

CROSS REFERENCE TO RELATED APPLICATIONS

This application is a continuation of U.S. application Ser. No. 17/237,707, entitled "Snapshot-Based Data Corruption Detection," filed Apr. 22, 2021, now allowed, which is incorporated by reference herein in its entirety.

BACKGROUND

A distributed database is a database with a set of interconnected storage and compute units that are distributed over one or more computer networks and/or the Internet. A Distributed Database Management System (DDBMS) manages the distributed database and provides mechanisms to make the distributed nature of the system transparent to the users. In these systems, data is intentionally distributed among multiple nodes to allow elasticity of compute or storage resources for easy scaling. A distributed database offers several advantages, such as, but not limited to, modular development, higher throughput, high concurrency and high scalability. However, distributed databases also require increased coordination among different components. As such, the probability of failure increases due to the increase in number of components required to implement the system. This increases the potential for data corruption. While the overall system is designed to prevent data corruption and/or recover to a consistent state after random failures, in reality, data corruption can still occur due to various software bugs, faults, etc. Failing to timely detect, root cause and mitigate the data corruption can seriously and adversely impact both the integrity of query results and the availability of the database.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are for detecting data corruption in a distributed data set system. For example, a system in accordance with an embodiment comprises one or more compute nodes for processing queries with respect to a distributed data set (e.g., a database) comprising a plurality of storage segments (e.g., pages). A write transaction resulting from a query with respect to a particular storage segment is logged in a log record that describes a modification to the storage segment. Each log record is identified by a log sequence number associated therewith. A log service provides the log record to a data server managing a portion of the distributed data set in which the storage segment is included, which performs the write transaction with respect to the storage segment as specified by the log record. For redundancy purposes, the data server has one or more replicas that manage respective replicas of the portion of the distributed data set managed thereby. For backup purposes, snapshots of each of the replicas are periodically generated. To determine a data corruption, a snapshot of one replica is automatically cross-validated with a snapshot of another replica. For example, log sequence numbers of the storage segments of one replica are compared to log sequence numbers of corresponding storage segments of the other replica. If a log sequence mismatch is detected, this means that an inconsistency exists between the log records applied by one replica data server and the log records applied by another replica data server. Thus, a different set of write transactions were applied by both page server replicas, thereby resulting in inconsistent snapshots. In the event that such a data corruption is detected, an alert is automatically generated to notify an administrator of the existence of the data corruption.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
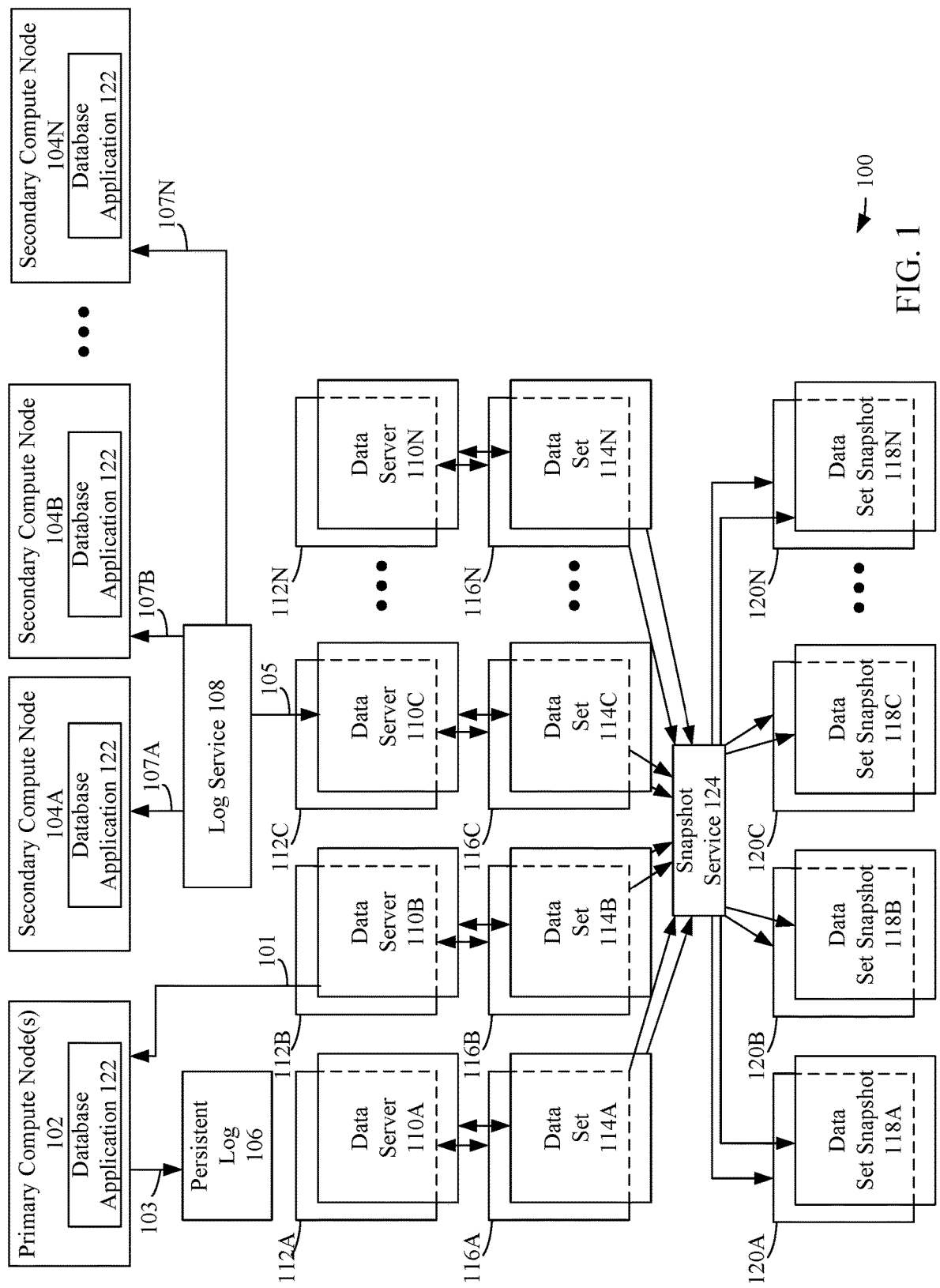
FIG. 1 shows a block diagram of a system for detecting a data corruption in a distributed data set system in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to detecting data corruption in a distributed data set system. For example, a system in accordance with an embodiment comprises one or more compute node for processing queries with respect to a distributed data set (e.g., a database) comprising a plurality of storage segments (e.g., pages). A write transaction resulting from a query with respect to a particular storage segment is logged in a log record that describes a modification to the storage segment. Each log record is identified by a log sequence number associated therewith. A log service provides the log record to a data server managing a portion of the distributed data set in which the storage segment is included, which performs the write transaction with respect to the storage segment as specified by the log record. For redundancy purposes, the data server has one or more replicas that manage respective replicas of the portion of the distributed data set managed thereby. For backup purposes, snapshots of each of the replicas are periodically generated. To determine a data corruption, a snapshot of one replica is cross-validated with a snapshot of another replica. For example, log sequence numbers of the storage segments of one replica are compared to log sequence numbers of corresponding storage segments of the other replica. If a log sequence mismatch is detected, this means that an inconsistency exists between the log records applied by one replica data server and the log records applied by another replica data server. Thus, a different set of write transactions were applied by both page server replicas, thereby resulting in inconsistent snapshots. In the event that such a data corruption is detected, an alert is automatically generated to notify an administrator of the existence of the data corruption.

Conventionally, a corruption is detected at the time the data server attempts to apply a log record to perform a write transaction with respect to the storage segment that it manages. At the time of performing the write transaction, the data server analyzes a field in the log record (also known as the "previous page log sequence number field" that indicates a log sequence number that should be included in the header of the storage segment to be modified. If that log sequence number is not included in the header, a determination is made that a data corruption exists. A problem with this approach is that it can be some time before a data server applies a log record, especially in instances when that storage segment is only being read. In certain instances, it can be weeks before the data server updates the storage segment. Thus, if the storage segment is not modified for a long time, the corruption remains undetected for a relatively long amount of time. During this time, applications will operate on the corrupt data, and therefore, return invalid results.

The embodiments described herein advantageously detect data corruption more quickly than conventional techniques by performing the cross-validation between replica snapshots, thereby enabling the corruptions to be acted on much sooner (as one no longer has to wait for the data to be modified to detect a data corruption). This limits the time window in which applications operate on the corrupt data. Thus, the integrity of the distributed data set system is advantageously improved, and the applications accessing the data set are more likely to operate on the correct data. Moreover, because such data corruptions are often a result of software bugs, the foregoing techniques may be implemented during the development and testing of new features of the distributed data set system. That way, data corruptions resulting from these new features may be detected, and the code causing these data corruptions may be fixed before the features are rolled out to the end users.

For example, FIG. 1 shows a block diagram of a system 100 for detecting a data corruption in a distributed data set system, according to an example embodiment. As shown in FIG. 1, system 100 comprises one or more primary compute nodes 102, secondary compute nodes 104A-104N, a persistent log 106, a log service 108, data servers 110A-110N, replica data servers 112A-112N, data sets 114A-114N, replica data sets 116A-116N, data set snapshots 118A-118N, replica data set snapshots 120A-120N, and snapshot service 124. System 100 may be implemented in a cloud-based environment, although the embodiments described herein are not so limited. Each of primary compute node(s) and secondary compute nodes 104A-104N may comprise one or more physical computing devices or virtual machines. Examples of physical computing devices, include, but are not limited to, server computers, server systems, etc. Data sets 114A-114N, replica data sets 116A-116N, data set snapshots 118A-118N, and replica data set snapshots 120A-120N may be stored via storage nodes, each comprising a plurality of physical storage disks (e.g., hard disk drives, solid state drives, etc.) that are accessible by respective data servers of data servers 110A-110N and replica data servers 112A-112N, for example, via a network.

As shown in FIG. 1, primary compute node(s) 102 are configured to execute one or more applications, such as database application 122. Database application 122 may be any database server application, including, but not limited to Microsoft® Azure SQL Database™ published by Microsoft® Corporation of Redmond, Wash. Database application 122 is configured to execute statements to create, modify, and delete data file(s) based on an incoming query. Queries may be user-initiated or automatically generated by one or more background processes. Such queries may be configured to add data file(s), merge data file(s) into a larger data file, re-organize (or re-cluster) data file(s) (e.g., based on a commonality of data file(s)) within a particular set of data file, delete data file(s) (e.g., via a garbage collection process that periodically deletes unwanted or obsolete data), etc.

Each of secondary compute nodes 104A-104N may also be configured to execute an instance of database application 122. One or more of secondary compute nodes 104A-104N may be utilized if one or more of primary compute node(s) 102 fails and recovery is not efficiently possible. In such an instance, one or more of secondary compute nodes 104A-104N is promoted to be a primary compute node and/or a new secondary compute node may be added to replace the promoted secondary compute node. It is noted that the secondary compute nodes may be added or removed regardless of whether a primary compute node failing.

Each of data sets 114A-114N include databases and/or the like, in embodiments, which may be very large data sets such as for "Big Data" analytics and/or data warehousing. It is contemplated herein that one or more of data sets 114A-114N are to the order of petabytes, or more, in embodiments. Data sets 114A-114N may be logically represented as structured, relational data, organized as rows of tables, having columns for the data. The data of data sets 114A-114N may be stored in one or more data files. Each of the data files may be logically divided into a storage segment, such as a page. The page may be 8 kilobytes in size, although the embodiments described herein are not so limited.

Data servers 110A-110N are configured to serve storage segments of data sets 114A-114N to primary compute node(s) 102 and update storage segments of data sets 114A-114N as transactions update data. Each of data servers 110A-110N is responsible for a subset of storage segments in the database. For example, data server 110A is responsible for storage segments of data sets 114A, data server 110B is responsible for storage segments of data sets 114B, data server 110C is responsible for storage segments of data sets 114C, and data server 110N is responsible for storage segments of data sets 114N. In accordance with an embodiment in which a storage segment corresponds to a page, each of data servers 110A-110N may be referred to as a page server.

System 100 also comprises one or more replicas for each of data servers 110A-110N, which are maintained for redundancy and availability. For example, as shown in FIG. 1, system 100 comprises one or more replica data servers 112A (which are replicas of data server 110A), one or more replica data servers 112B (which are replicas of data server 110B), one or more replica data servers 112C (which are replicas of data server 110C), and one or more replica data servers 112N (which are replicas of data server 110N). Each of replica data servers 112A-112N is associated with a replica data set. For example, replica data server(s) 112A are associated with replica data set 116A (which is a replica of data set 114A), replica data server(s) 112B are associated with replica data set 116B (which is a replica of data set 114B), replica data server(s) 112C are associated with replica data set 116C (which is a replica of data set 114C), and replica data server(s) 112D are associated with replica data set 116D (which is a replica of data set 114D).

When performing a write transaction, such as creating or modifying a data file, primary compute node(s) 102 logs the operation (shown as 103) into a persistent log 106. Persistent log 106 is utilized to recover data in the event of a system failure. For example, database application 122 of primary compute node(s) 102 may first read a particular storage segment from a data server of data servers 110A-110N that is responsible for that storage segment. This ensures that a copy of the storage segment is brought into a cache of primary compute node(s) 102. The storage segment may have been previously read by primary compute node(s) 102, in which case that storage segment will already be in the cache of primary compute node(s) 102. To obtain the storage segment, database application 122 of primary compute node(s) 102 may issue a read operation to the responsible data server (e.g., data server 110B), and the data server provides the data (shown as data 101) to primary compute node(s) 102.

Figure 2:
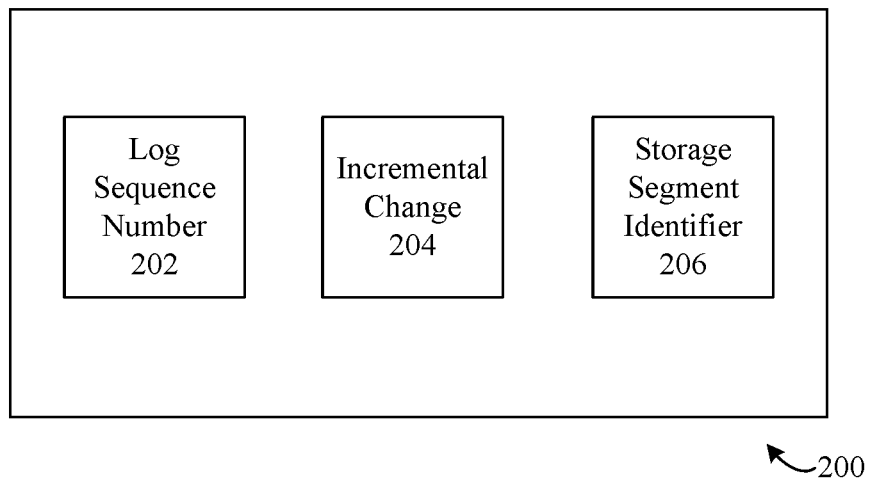
FIG. 2 depicts a log record in accordance with an example embodiment.

Database application 116 of primary compute node(s) 102 may then write to the read data stored in the cache. Database application 116 also creates a log record of that write operation. The log record includes the incremental change made or to be made as part of the write operation. The log record also includes a log sequence number and a storage segment identifier. For instance, FIG. 2 depicts a log record 200 in accordance with an example embodiment. As shown in FIG. 2, log record 200 includes a log sequence number 202, a description 204 of an incremental change made via a write transaction, and a storage segment identifier 206. Log sequence number 202 is a number that uniquely identifies a log record (e.g., log record 200), and that represents a position of the log record within a log (e.g., persistent log 106). Log sequence number 202 is typically a monotonically increasing number such that the higher the log sequence number, the more recent the log record was placed within the log. Storage segment identifier 206 identifies a location of the storage segment within one of data sets 114A-114N to which the write transaction is to be applied.

Figure 3:
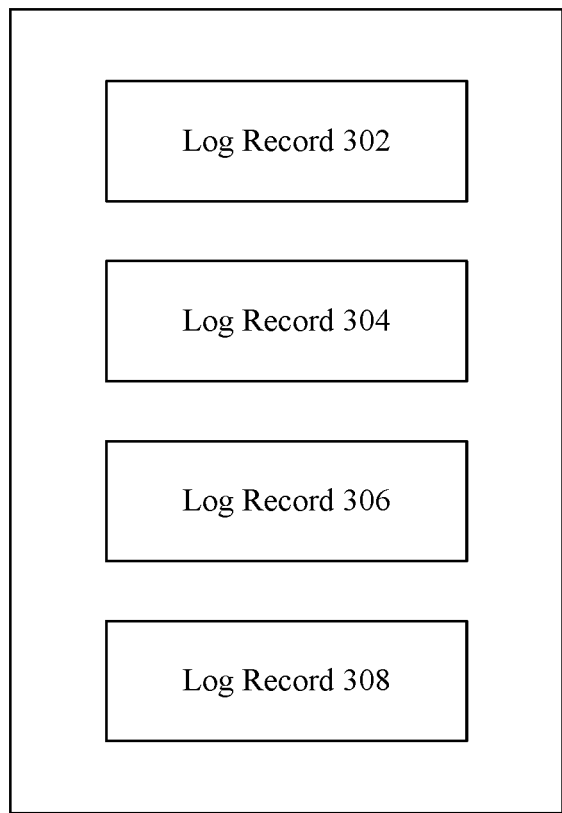
FIG. 3 depicts a block of log records in accordance with an example embodiment.

In accordance with an embodiment, log records are organized into blocks. A block is a unit of storage that may be written to and read from atomically (i.e., at one time—such that the write or read is either completed for the entire block, or abandoned with no write being performed at all). A typical block size will be constant in a computing system, but example block sizes may be any multiple of the size of the disk sector (e.g., multiples of 512 bytes or 4096 bytes, depending on the disk type). Because a log record may be much smaller than a block, a block may include multiple log records. For example, FIG. 3 depicts a block 300 populated with multiple log records 302, 304, 306, and 308 in accordance with an example embodiment. As an example, log record 200 of FIG. 2 may be log record 302 of FIG. 3. Each of log records 302, 304, 306, and 308 may occupy a slot within block 300. When writing the log record to persistent log 106 (as shown in FIG. 1), it may be a block of log records (such as block 300) that is written to persistent log 106. Primary compute node(s) 102 may wait for some number of log records to be generated before writing the log records as a block to the persistent log 106.

Log service 108 may execute on one or more server computers or computing devices, or alternatively, a virtual machine. Log service 108 assists write operations that are performed and logged by the primary compute node(s) 102 to be propagated to the appropriate data server of data servers 110A-110N and its corresponding replica of replica data servers 112A-112N. For example, when determining that a particular log record is to be applied to one of data sets 114A-114N, log service 108 identifies a particular data server of data servers 110A-110N that is assigned to the data set of data sets 114A-114N that includes the particular storage segment to be written to via storage segment identifier 206. Log service 108 may also identify a particular replica data server of replica data servers 112A-110N corresponding to the particular data server that is responsible for the particular storage segment in the corresponding replica data set of replica data sets 116A-116N. In the case in which the set of storage segments are contiguous in an address space, the assignment of the set of storage segments to each data server may be made to align with the most significant bits of the storage segment identifier. For instance, suppose that the storage segment identifiers range from binary 00000 00000 to binary 01101 01111. In this case, there might be seven data servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which data server is assigned to store a particular storage segment becomes an efficient computation. Log service 108 may thus determine the appropriate data server of data servers 110A-110N for the log record (e.g., log record 200) based on the storage segment identifier (e.g., storage segment identifier 206) included in the log record. Log service 108 may maintain a mapping between data servers 110A-110N and replica data servers 112A-112N. Thus, when log service 108 determines which data server to provide the log record, log service 108 easily determines which replica data server corresponds thereto.

Then, the data server, and corresponding replica data server, are caused to perform the particular write transaction (as specified in the log record) to the particular storage segment (designated in the particular log record) of a corresponding data set of data sets 114A-114N (and corresponding data set of replica data sets 116A-116N). For instance, suppose log service 108 determines that data server 110C is responsible for the storage segment identified by storage segment identifier 206. In this example, log service 108 provides a request 105 comprising the log record to data server 110C and replica data server 112C. Data server 110C and replica data server 116 performs the write transaction specified in the received log record (referred to as re-doing the log record) with respect the storage segment identified by the received log record. This would represent the completion of the write transaction that began when the primary compute node(s) 102 read that storage segment (e.g., data 101) from the data server 110B. In another example, rather than log service 108 by providing request 105, data servers 110A-110N and data servers 112A-112N may query (e.g., periodically) log service 108 for the appropriate log records. Thus, the providing of the appropriate log record to a data server may be in response to the request from a data server.

As data servers 110A-110N (and replica data servers 112A-112N) apply changes to storage segments of their respective data sets, data servers 110A-110N (and replica data servers 112A-112N) also update a header of the storage segment. The header may comprise various fields describing various attributes of the storage segment. For example, the header may comprise a storage segment identifier (e.g., storage segment identifier 206, as shown in FIG. 2), and a log sequence number (e.g., log sequence number 202, as shown in FIG. 2) for that storage segment. In an embodiment in which a storage segment is a page, the storage segment identifier and the log sequence number may be referred to as a page identifier and a page log sequence number. In accordance with such an embodiment, each page identifier is a multiple of 8 kilobytes, where a first page is located at offset 0, the next page is located at an offset of 8 kilobytes, a third page is located at an offset of 16 kilobytes, etc. The log sequence number stored in the header of a particular storage segment identifies a corresponding log record (e.g., log record 200) that identifies the latest modification made to the storage segment. The log sequence number is updated each time a modification is made to the storage segment.

Log service 108 may provide log records one at a time, or alternatively, one block at a time. For instance, if log service 108 determines that there are log records (e.g., any of a block of log records that have a storage segment identifier within the set of storage segments assigned to a particular storage segment server, log service 108 may send the entire block to the particular data server.

In addition, log service 108 may ensure that the log record is not communicated to any entity until log service 108 has been notified (e.g., by database application 122) that the log record has been securely written into persistent log 106. This helps the recovery process be consistent. During recovery, the recovery process uses persistent log 106 to determine what operations have been completed. If other components in the system (e.g., a secondary compute node of secondary compute nodes 104A-104N or any of data servers 110A-110N) have performed operations that persistent log 106 is not aware of, then the recovery will fail to achieve a reliable state. Data sets 114A-114N then become ambiguous, and thus corrupt.

Log service 108 may provide log records to secondary compute nodes 104A-104N, which update their respective caches in accordance with the incremental changes described in the log records. For example, log service 108 may provide the corresponding log record via requests 107A-107N to secondary compute nodes 104A-104N. While the log record may be pushed to secondary compute nodes 104A-104N, log service 108 may likewise handle requests for log records (e.g., from secondary compute nodes 104A-104N). As described above, log service 108 may ensure that log records are not communicated to the secondary compute systems 104A-104N unless the log record is already confirmed as written to persistent log 106. In accordance with an embodiment, secondary compute nodes 104A-104N may be configured to ignore the log record if it is for writing to a storage segment that is not already cached (and thus would cause a read from a data server). In that case, if secondary compute nodes 104A-104N were to use that storage segment later, secondary compute nodes 104A-104N may read that storage segment from the data server (which already has the write of the skipped log record applied).

While secondary compute nodes 104A-104N primary act as hot standby nodes for failover purposes, in accordance with an embodiment, secondary compute nodes 104A-104N may act as read-only compute nodes for offloading read workloads. That is, secondary compute nodes 104A-104N may be utilized to read data sets 114A-114N via issuing read commands to data servers 110A-110N, which in turn, retrieve the data from data sets 114A-114N, respectively, and returns the retrieved data to secondary compute nodes 104A-104N.

Snapshot service 124 may execute on one or more server computers or computing devices, or alternatively, a virtual machine. Snapshot service 124 is configured to generate snapshots of data sets 114A-114N and replica data sets 116A-116N. For example, snapshot service 124 may generate data set snapshot 118A for data set 114A, data set snapshot 118B for data set 114B, data set snapshot 118C for data set 114C, data set snapshot 118D for data set 114D, replica data set snapshot(s) 120A for replica data set(s) 116A, replica data set snapshot(s) 120B for replica data set(s) 116B, replica data set snapshot(s) 120C for replica data set(s) 116C, and replica data set snapshot(s) 120D for replica data set(s) 116D. Data set snapshots 118A-118N and replica data set snapshots 120A-120N are utilized as backups.

Snapshot service 124 may generate any number of snapshots for a given data set of data sets 114A-114N and for a given replica data set of replica data sets 116A-116N. For instance, snapshot service 124 may periodically (every hour, every day, every week, etc.) generate snapshots, thereby enabling data to be restored at various points in time in accordance with a backup retention period implemented for data sets 114A-114N and/or replica data sets 116A-116N.

When generating a snapshot for a particular data set, snapshot service 124 logs the log sequence number of the first log record (in persistent log 106) not yet redone at the time the snapshot is generated. That is, snapshot service 124 determines the first log record that has not yet been written to the data set by its corresponding data server. Snapshot service 124 associates the log sequence number of that log record with the snapshot at the time of generation. For instance, snapshot service 124 may store the log sequence number as metadata of the generated snapshot. Such a log sequence number is referred herein as the begin log sequence number of the snapshot. Snapshot service 124 may also store a timestamp representative of a time at which the snapshot was generated in the metadata of that snapshot.

In certain instances, a data server and/or one or more of its replicas may inadvertently skip the application of a log record (e.g., due to software bugs, hardware crashes, etc.). In such instances, a data corruption is created, as a data set and/or one or more of its replicas have inconsistent versions of the data. The detection of such data corruptions should be detected as soon as possible to avoid applications from utilizing incorrect data. The techniques described herein detect data corruption by cross-validating snapshots for a given data set.

Figure 4:
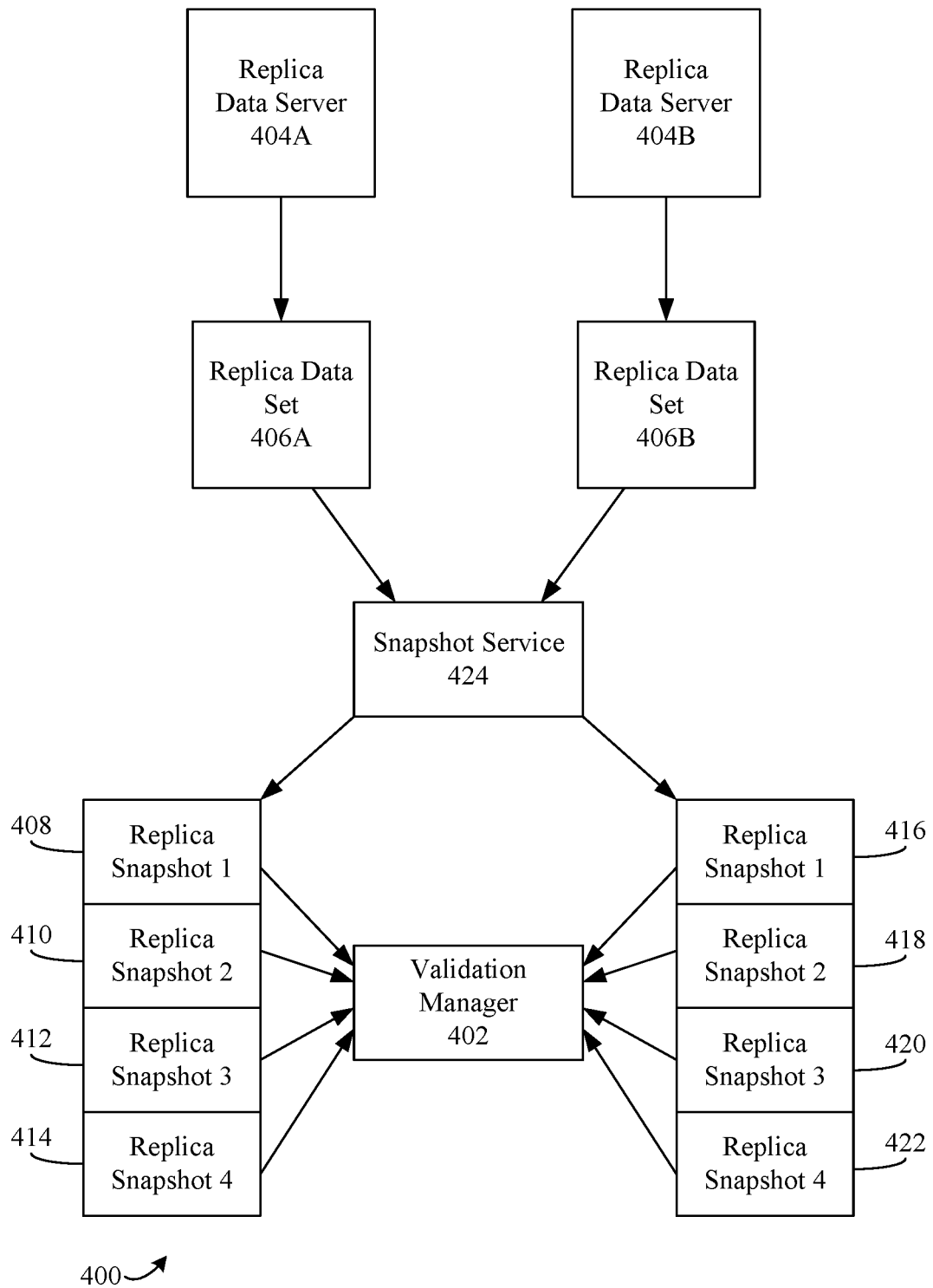
FIG. 4 depicts a system for determining a snapshot pair in accordance with an example embodiment.

To cross-validate snapshots, a snapshot pair is first determined. For example, FIG. 4 depicts a system 400 for determining a snapshot pair in accordance with an example embodiment. As shown in FIG. 4, system 400 comprises a validation manager 402, a first replica data server 404A, a second replica data server 404B, a first replica data set 406A, a second replica data set 406B, first replica snapshots 408, 410, 412, and 414, second replica snapshots 416, 418, 420, and 422, and a snapshot service 424. Replica data server 404A and replica data server 404B are replicas of a page server. For example, replica data server 404A and replica data server 404B are examples of replica data server(s) 112A, which are replicas of data server 110A. Replica data set 406A and replica data set 406B are replicas of a data set managed by the page server associated with replica data servers 404A and 404B. For example, replica data set 406A and replica data set 406B are examples of replica data set(s) 116A, which are replicas of data set 114A. Snapshot service 424 is an example of snapshot service 124, as described above with reference to FIG. 1. As shown in FIG. 4, snapshot service 424 has generated four snapshots of replica data set 406A (replica snapshots 408, 410, 412, and 414) and has generated four snapshots of replica data set 406B 406A (replica snapshots 416, 418, 420, and 422). Each of replica snapshots 408, 410, 412, and 414 represent snapshots of replica data set 406A that were generated at different times. Similarly, each of replica snapshots 416, 418, 420, and 422 represent snapshots of replica data set 406B that were generated at different times.

Validation manager 402 is configured to determine a snapshot pair between a first set of snapshots generated for replica data set 406A (i.e., snapshots 408, 410, 412, and 414) and a second set of snapshots generated replica data set 406B (i.e., snapshots 416, 418, 420, and 222). To determine the snapshot pair, validation manager 402 determines the most recent snapshot from one of the replica snapshots generated for replica data set 406A or from one of the replica snapshots generated for replica data set 406B. The most recent snapshot may be determined based on a timestamp associated with the replica snapshots. For instance, validation manager 402 may designate replica snapshots 408, 410, 412, and 414 as a primary list of replica snapshots and determine the most recent snapshot generated therefrom based on their respective timestamps. The replica snapshot of replica snapshots 408, 410, 412, and 414 having the most recent timestamp may be designated as the primary snapshot.

After determining the primary snapshot, validation manager 402 may determine replica snapshot from replica snapshots 416, 418, 420 and 422 being closest in time to the primary snapshot. For example, validation manager 402 may compare the timestamps of each of replica snapshots 416, 418, 420 and 422 to the timestamp of the primary snapshot and determine which of the timestamps is closest in time to the timestamp of the primary snapshot. The replica snapshot having the timestamp closest to the timestamp of the primary snapshot is designated as the secondary snapshot. Validation manager 402 attempts to select the nearest snapshot to the primary snapshot to minimize the amount of unvalidatable pages because a snapshot pair that is much newer will experience many more write transactions and have higher storage segment log sequence numbers for corresponding storage segments, thereby making them unvalidatable (as will be described below). The determined primary snapshot and the secondary snapshot are designated to be the snapshot pair to be cross-validated. It is noted that in other embodiments, replica snapshots 416, 418, 420, and 422 may designated as the primary list, that a primary snapshot may be determined therefrom, and that a secondary snapshot may be determined from among replica snapshots 408, 410, 412, and 414.

Figure 5:
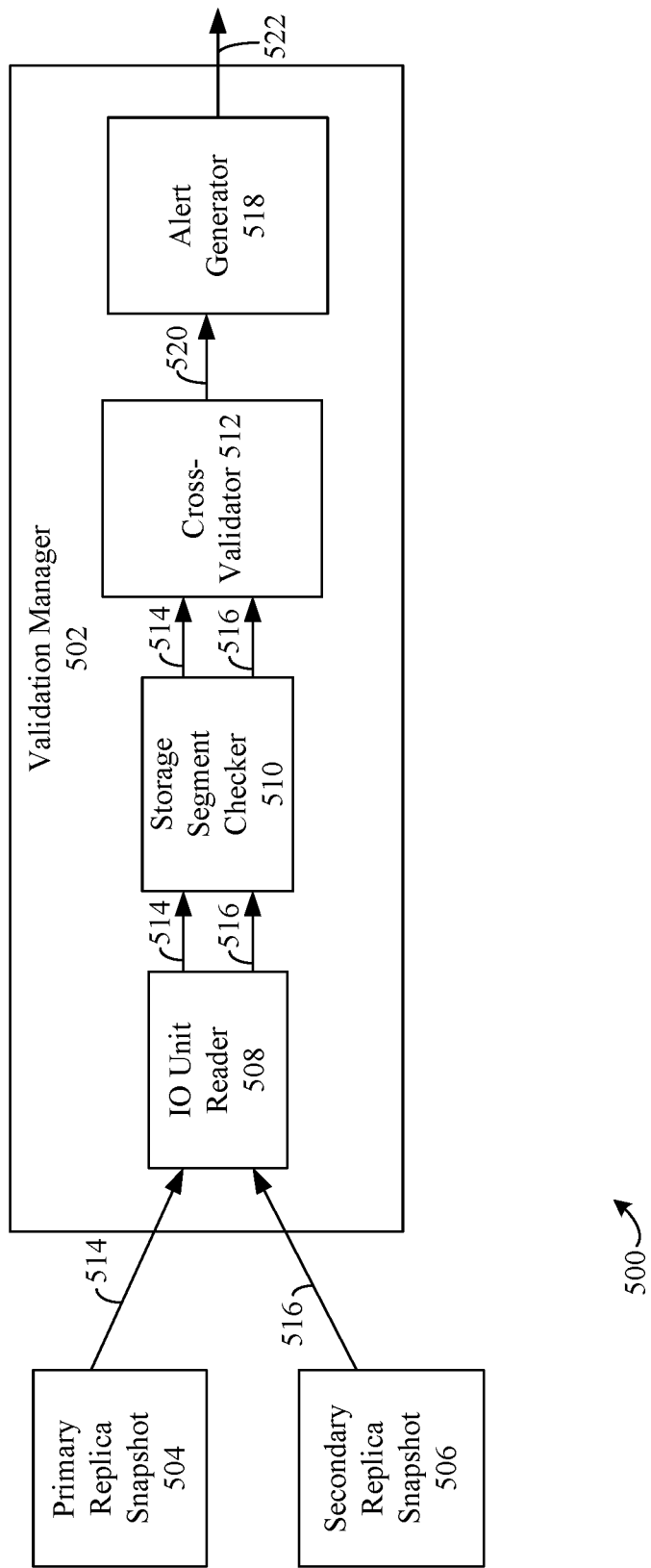
FIG. 5 depicts a system for cross-validating a snapshot pair to detect a data corruption in accordance with an example embodiment.

Once the snapshot pair is determined, validation manager 402 transitions to the cross-validation phase. In this phase, validation manager 402 compares various characteristics of the primary snapshot to characteristics of the secondary snapshot to determine a data corruption. FIG. 5 depicts a system 500 for cross-validating a snapshot pair to detect a data corruption in accordance with an example embodiment. As shown in FIG. 5, system 500 comprises a validation manager 502, a primary replica snapshot 504, and a second replica snapshot 506. Validation manager 502 is an example of validation engine 402, as described above with reference to FIG. 4. Primary replica snapshot 504 represents a determined primary snapshot (e.g., from among replica snapshots 408, 410, 412, and 414, as described above with reference to FIG. 4). Secondary replica snapshot 506 represents a determined secondary snapshot (e.g., from among replica snapshots 416, 418, 420, and 422, as described above with reference to FIG. 4). Validation manager 502 comprises an input/output (IO) reader 508, a storage segment checker 510, a cross-validator 512, and an alert generator 518.

IO unit reader 508 is configured to read a predetermined amount (or "IO unit") of data from each of primary replica snapshot 504 and secondary replica snapshot 506 (shown as IO units 514 and 516, respectively, where each IO unit comprises a plurality of storage segments (e.g., each being 8 kilobytes). In accordance with an embodiment, the IO unit size is 4 megabytes. IO unit reader 508 provides IO units 514 and 516 to storage segment checker 510.

Storage segment checker 510 is configured to analyze each storage segment in each of IO units 514 and 516 and determine which storage segments therein should be cross-validated. For example, for each storage segments in IO units 514 and 516, storage segment checker 510 may determine whether the storage segment comprises all zeroes. Such storage segments are designated by storage segment checker 510 as being corrupted.

In accordance with an embodiment, storage segments may be encrypted for security purposes. Storage segment checker 510 may be configured to decrypt each of the storage segments in IO units 514 and 516. If the decryption fails for certain storage segments, storage segment checker 510 determines that such storage segments are corrupt and designates these storage segments as such.

Storage segment checker 510 may also be configured to perform one or more logical consistency checks on each storage segment of JO units 514 and 516. If any of the logical consistency check(s) fail for a particular storage segment, storage segment checker 510 designates the storage segment as being corrupt. Examples of logical consistency checks include, but are not limited to, checksum-based checks, torn page-based checks, short transfer-based checks, stale read-based checks, page audit failure-based checks, etc.

Storage segment checker 510 may also be configured to determine whether a particular storage segment of IO unit 514 and/or IO unit 516 is designated as being free. If a particular storage segment of an IO unit is designated as being free, validation for that storage segment and its corresponding storage segment in the other IO unit is skipped. Storage segment checker 510 designates such storage segments as being unavailable for cross-validation.

Any storage segment that is not designated as being corrupted or unavailable may be left undesignated, or alternatively, may be designated as being validateable. After storage segment checker 510 completes its various checks, storage segment checker 510 provides IO units 514 and 516 to cross-validator 512.

Cross-validator 512 is configured to cross-validate storage segments of IO unit 514 with corresponding storage segments of IO unit 516 that are located at the same logical position. Cross-validator 512 only validates storage segments that are not designated as being corrupted or unavailable. Any storage segment designated as being corrupted or unavailable are skipped, as these storage segments are not validateable with complete certainty. For instance, cross-validator 512 may initially compare the storage segment identifier of a first storage segment from IO unit 514 to the storage segment identifier of a corresponding first storage segment from IO unit 516 (i.e., a storage segment located at the same offset) (assuming both are not designated as being corrupted or unavailable). If the storage segment identifiers do not match, cross-validator 512 determines that a data corruption has been detected between the two storage segments. Cross-validator 512 performs this check for each storage segment of IO units 514 and 516 that are not designated as being corrupted or unavailable.

If the storage segment identifies match, cross-validator 512 then compares the storage segment log sequence number of storage segments of IO unit 516 (that are not designated as being corrupted or unavailable) to storage segment log sequence numbers of corresponding storage segments of IO unit 516 (that are not designated as being corrupted or unavailable) that are located at the same logical position. However, in order to compare with certainty, cross-validator 512 only compares storage segment log sequence numbers that are lower than the minimum between the begin log sequence number of primary replica snapshot 504 and the begin log sequence number of secondary replica snapshot 506 (referred herein as the minimum log sequence number). If both storage segment log sequence numbers are below the minimum log sequence number, both storage segment log sequence numbers should match. Otherwise, one of primary replica snapshot 504 or secondary replica snapshot 56 has missed a log record application.

Accordingly, cross-validator 512 compares the storage segment log sequence numbers to determine whether they match. If they match, cross-validator 512 determines that no data corruption exists between the two storage segments and performs the foregoing validation for the storage segments of IO unit 514 and 516 located at the next offset. If they do not match, cross-validator 512 determines that a data corruption exists between the two storage segments.

In the event that cross-validator 512 detects a data corruption, cross-validator 512 provides a notification 520 to alert generator 518. Alert generator 518 may automatically issue an alert 122 to a computing device of an administrator indicating that a data corruption with respect to the two storage segments has been detected. This way, the administrator can quickly identify the cause of the data corruption and resolve the issue that caused the data corruption. Examples of alert 122 include a short messaging service (SMS) message, a telephone call, an e-mail, a notification that is presented via an incident management service, etc.

It is noted that validation manager 502 performs the foregoing operations for each IO unit of which primary replica snapshot 504 and secondary replica snapshot 506 comprises. For example, after IO units 514 and 516 are read and cross-validated, IO unit reader 508 may read the next IO units from primary replica snapshot 506 and secondary replica snapshot 506, respectively, and cross-validate these IO units in a similar manner as described above. In another example, IO unit reader 508 may read the next IO units from primary replica snapshot 506 and secondary replica snapshot 506, respectively, after providing IO units 514 and 516 to storage segment checker 510.

Figure 6:
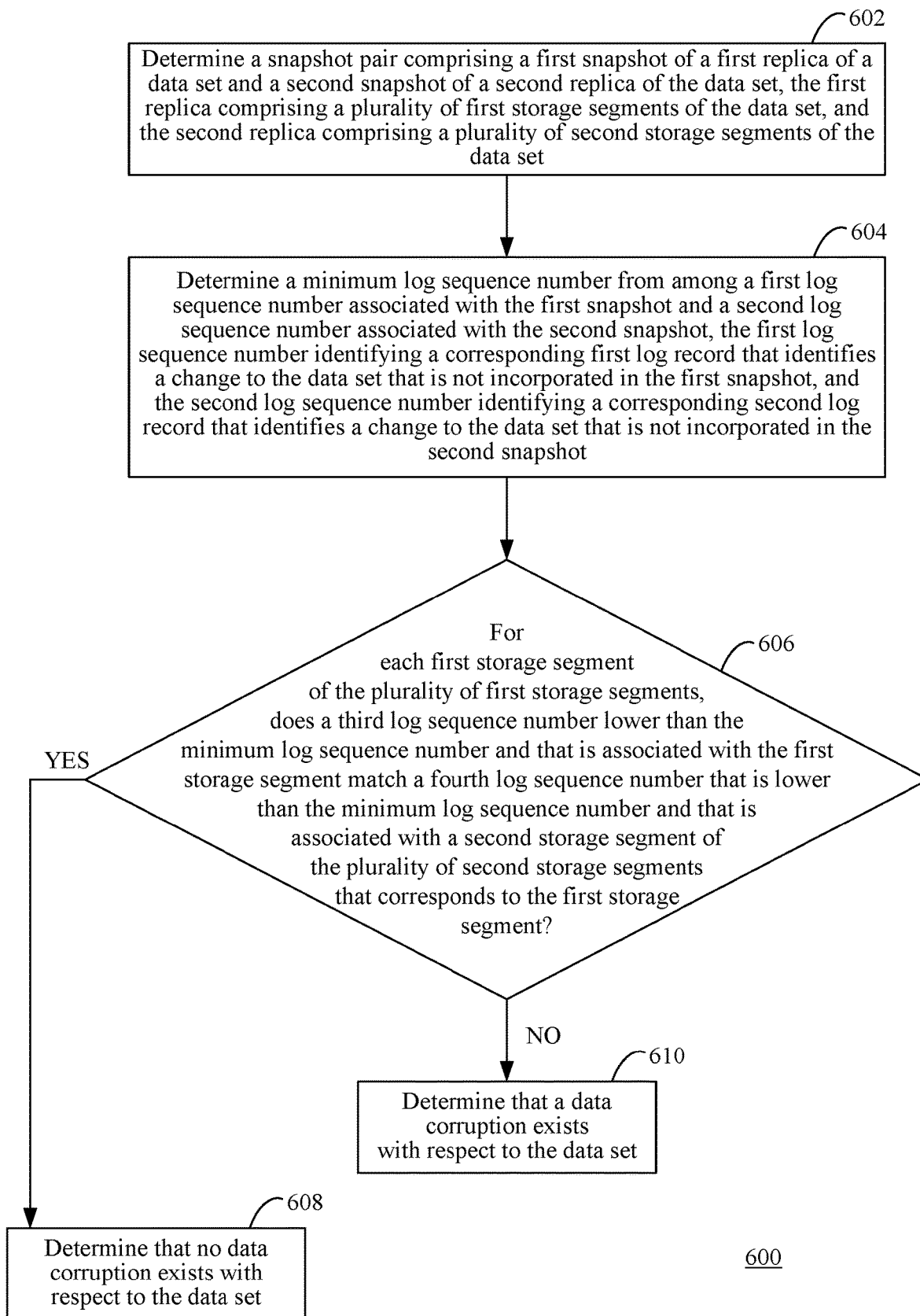
FIG. 6 shows a flowchart of a method for detecting data corruptions based on cross-validating snapshots in accordance with an example embodiment.

Accordingly, data corruptions may be detected in many ways. For example, FIG. 6 shows a flowchart 600 of a method for detecting data corruptions based on cross-validating snapshots in accordance with an example embodiment. In an embodiment, flowchart 600 may be implemented by systems 400 and 500 shown in FIGS. 4 and 5, although the method is not limited to that implementation. Accordingly, flowchart 600 will be described with continued reference to FIGS. 4 and 5. Other structural and operational embodiments will be apparent to persons skilled in the relevant art(s) based on the discussion regarding flowchart 600 and systems 400 and 500 of FIGS. 4 and 5.

Flowchart 600 begins with step 602. In step 602, a snapshot pair comprising a first snapshot of a first replica of a data set and a second snapshot of a second replica of the data set is determined. The first replica comprises a plurality of first storage segments of the data set, and the second replica comprises a plurality of second storage segments of the data set. For example, with reference to FIG. 5, validation manager 502 determines a snapshot pair comprising a first snapshot of a first replica of a data set (e.g., primary replica snapshot 504, which is a snapshot of replica data set 406A) and a second snapshot of a second replica of the data (e.g., secondary replica snapshot 506, which is a snapshot of replica data set 406B) is determined. Primary replica snapshot 504 comprises a plurality of first storage segments, and secondary replica snapshot 506 comprises a plurality of second storage segments.

In accordance with one or more embodiments, the plurality of first storage segments correspond to a plurality of first pages of the data set, and the plurality of second storage segments correspond to a plurality of second pages of the data set. For example, with reference to FIG. 5, the storage segments of IO unit 514 correspond to pages of the data set, and the storage segments of IO unit 516 correspond to pages of the data set.

In accordance with one or more embodiments, the third log sequence number identifies a corresponding first log record that identifies the latest modification made to the first storage segment, and the fourth log sequence number identifies a corresponding second log record that identifies the latest modification made to the second storage segment. For example, with reference to FIG. 5, the third log sequence number identifies a corresponding first log record that identifies the latest modification made to the first storage segment of IO unit 514, and the fourth log sequence number identifies a corresponding second log record that identifies the latest modification made to the second storage segment of IO unit 516.

In accordance with one or more embodiments, the snapshot pair is determined in accordance with flowchart 700, which is described below with reference to FIG. 7.

At step 604, a minimum log sequence number from among a first log sequence number associated with the first snapshot and a second log sequence number associated with the second snapshot is determined. The first log sequence number identifies a corresponding first log record that identifies a change to the data set that is not incorporated in the first snapshot, and the second log sequence number identifies a corresponding second log record that identifies a change to the data set that is not incorporated in the second snapshot. For example, with reference to FIG. 5, cross-validator 512 determines a minimum log sequence number from among a first log sequence number associated with primary replica snapshot 504 and a second log sequence number associated with secondary replica snapshot 506.

At step 606, for each first storage segment of the plurality of first storage segments, a determination is made as to whether a third log sequence number that is lower than the minimum log sequence number and that is associated with the first storage segment matches a fourth log sequence number that is lower than the minimum log sequence number and that is associated with a second storage segment of the plurality of second storage segments that corresponds to the first storage segment. If a determination is made that there is mismatch between the third log sequence number and the fourth log sequence number, flow continues to step 608. Otherwise, flow continues to step 610. For example, with reference to FIG. 5, cross-validator 512 determines whether a third log sequence number that is lower than the minimum log sequence number and that is associated with the first storage segment of IO unit 514 matches a fourth log sequence number that is lower than the minimum log sequence number and that is associated with a second storage segment of the plurality of second storage segments of IO unit 516 that corresponds to the first storage segment.

At step 608, in response to determining a mismatch between the third log sequence number and the fourth log sequence number, a determination is made that a data corruption exists with respect to the data set. For example, with reference to FIG. 5, cross-validator 512 determines that a data corruption exists with respect to the data set (e.g., replica data sets 406A and/or 406B).

In accordance with one or more embodiments, in response to determining that a data corruption exists with respect to the data set, an alert that is automatically generated that indicates that the data corruption exists with respect to the data set. For example, with reference to FIG. 5, in the event that cross-validator 512 detects a data corruption, cross-validator 512 provides a notification 520 to alert generator 518. Alert generator 518 may automatically issue an alert 522 to a computing device of an administrator indicating that a data corruption with respect to the two storage segments has been detected. This way, the administrator can quickly identify the cause of the data corruption and resolve the issue that caused the data corruption. Examples of alert 522 include a short messaging service (SMS) message, a telephone call, an e-mail, a notification that is presented via an incident management service, etc.

At step 610, in response to determining that the third log sequence number and the fourth log sequence number match, a determination is made that no data corruption exists with respect to the data set. For example, with reference to FIG. 5, cross-validator 512 determines that a data corruption does not exist with respect to the data set (e.g., replica data sets 406A and/or 406B).

Figure 7:
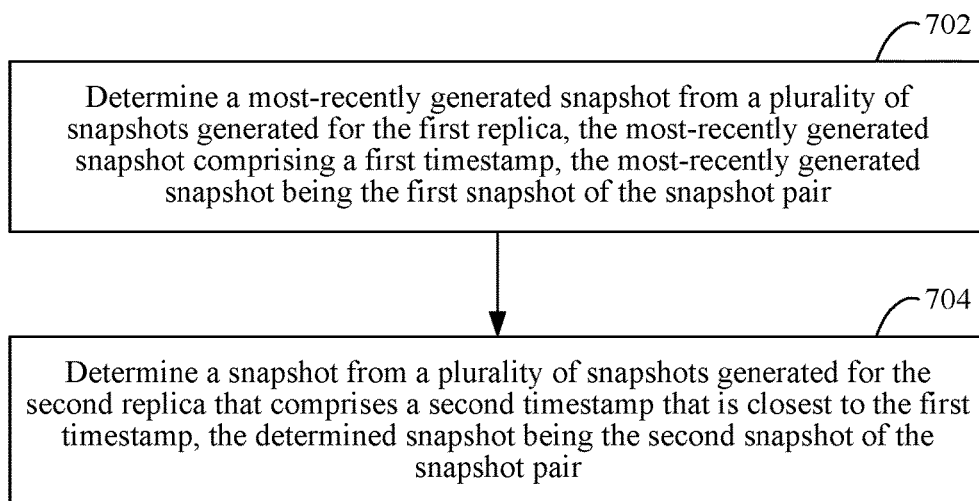
FIG. 7 shows a flowchart of a method for determining a snapshot pair in accordance with an example embodiment.

FIG. 7 shows a flowchart 700 of a method for determining a snapshot pair in accordance with an example embodiment. In an embodiment, flowchart 700 may be implemented by system 400 shown in FIG. 4, although the method is not limited to that implementation. Accordingly, flowchart 700 will be described with continued reference to FIG. 4. Other structural and operational embodiments will be apparent to persons skilled in the relevant art(s) based on the discussion regarding flowchart 700 and system 400 and FIG. 4.

Flowchart 700 begins with step 702. In step 702, a most-recently generated snapshot from a plurality of snapshots generated for the first replica is determined. The most-recently generated snapshot comprises a first timestamp and is first snapshot of the snapshot pair. For example, with reference to FIG. 4, validation manager 402 determines a most recently-generated snapshot from among replica snapshots 408, 410, 412, and 414. For example, validation manager 402 may determine the snapshot of replica snapshots 408, 410, 412, and 414 having the most recent timestamp.

In step 704, a snapshot from a plurality of snapshots generated for the second replica that comprises a second timestamp that is closest to the first timestamp is determined, the determined snapshot being the second snapshot of the snapshot pair. For example, with reference, with reference to FIG. 4, validation manager 402 determines a snapshot from among replica snapshots 416, 418, 420, and 422 that comprises a second timestamp that is closest to the first timestamp, the determined snapshot being the second snapshot.

Figure 8:
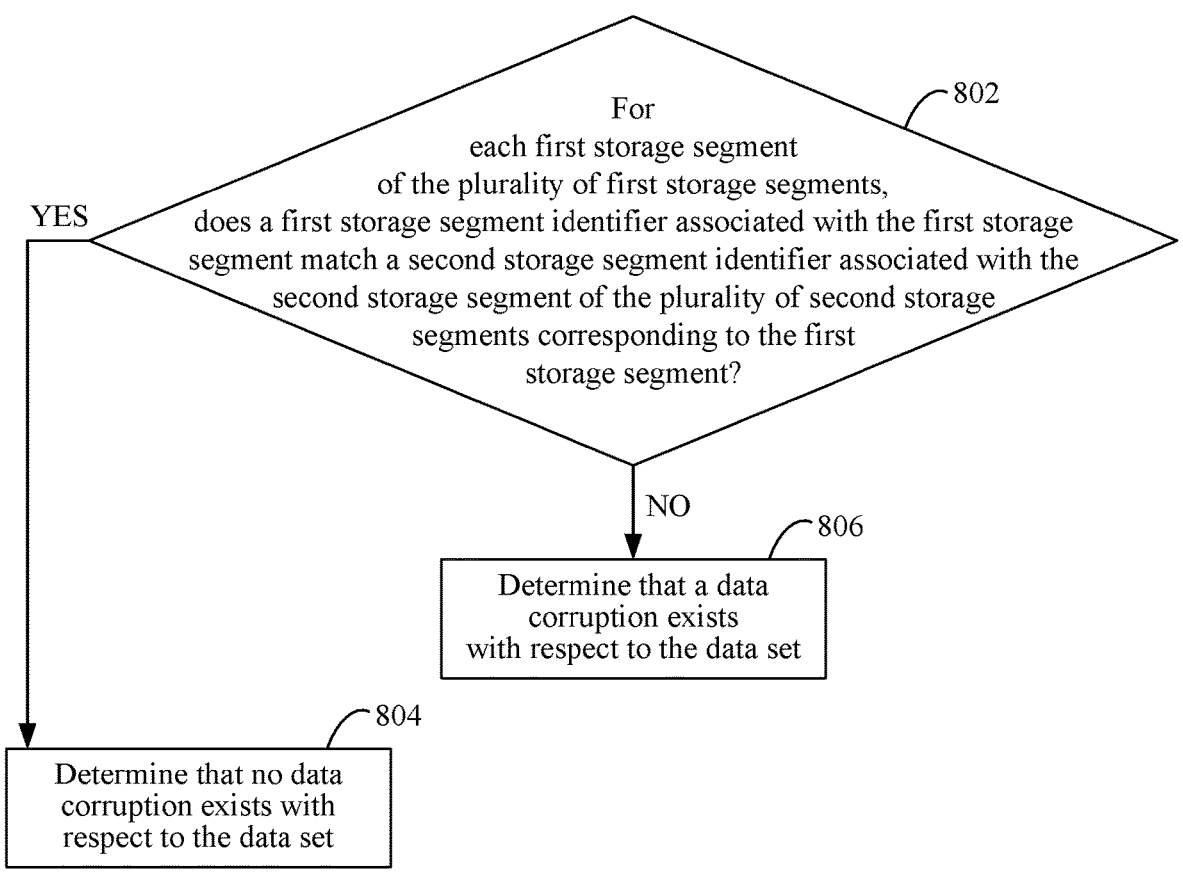
FIG. 8 shows a flowchart of a method for determining a data corruption based on a storage segment identifier mismatch in accordance with an example embodiment.

In accordance with one or more embodiments, a data corruption may also be detected if a storage segment identifier of a first storage segment of a first replica snapshot does not match a storage segment identifier of a second storage segment of a second replica snapshot that corresponds to the first storage segment. FIG. 8 shows a flowchart 800 of a method for determining a data corruption based on a storage segment identifier mismatch in accordance with an example embodiment. In an embodiment, flowchart 800 may be implemented by system 500 shown in FIG. 5, although the method is not limited to that implementation. Accordingly, flowchart 800 will be described with continued reference to FIG. 5. Other structural and operational embodiments will be apparent to persons skilled in the relevant art(s) based on the discussion regarding flowchart 800 and system 500 and FIG. 5.

Flowchart 800 begins with step 802. In step 802 for each first storage segment of the plurality of first storage segments, a determination is made as to whether a first storage segment identifier associated with the first storage segment matches a second storage segment identifier associated with the second storage segment of the plurality of second storage segments corresponding to the first storage segment. In response to determining a mismatch between the first storage segment identifier and the second storage segment identifier, flow continues to step 804. Otherwise, flow continues to step 806. For example, with reference to FIG. 5, cross-validator 512 determines whether a first storage segment identifier associated with a first storage segment of IO unit 514 matches a second storage segment identifier associated with the second storage segment of IO unit 516 that corresponds to the first storage segment (e.g., both the first storage segment and the second storage segment have the same logical offset).

In step 804, a determination is made that a data corruption exists with respect to the data set. For example, with reference to FIG. 5, cross-validator 512 determines that a data corruption exists with respect to the data set (e.g., replica data sets 406A and/or 406B).

In step 806, in response to determining that the first storage segment identifier and the second storage segment identifier match, a determination is made that no data corruption exists with respect to the data set. For example, with reference to FIG. 5, cross-validator 512 determines that a data corruption does not exist with respect to the data set (e.g., replica data sets 406A and/or 406B).

III. Example Computer System Implementation

The systems and methods described above in reference to FIGS. 1-8, may be implemented in hardware, or hardware combined with one or both of software and/or firmware. For example, system 900 may be used to implement any of nodes 102 and 104A-104N, persistent log 106, log service 108, data servers 110A-110N, replica data servers 112A-112N, data sets 114A-114N, replica data sets 116A-116N, data set snapshots 118A-118N, replica data set snapshots 120A-120N, database application 122, and/or snapshot service 124 of FIG. 1, replica data servers 404A and 404B, replica data sets 406A and 406B, snapshot service 424, validation manager 402, replica snapshots 408, 410, 412, and 414 and/or replica snapshots 416, 418, 420, and 422 of FIG. 4, validation manager 502 primary replica snapshots 504 and 506, IO unit reader 508, storage segment checker 510, cross-validator 512 and/or alert generator 518 of FIG. 5 and/or any of the components respectively described therein, and flowcharts 600, 700, and/or 800 may be each implemented as computer program code/instructions configured to be executed in one or more processors and stored in a computer readable storage medium. Alternatively, any of nodes 102 and 104A-104N, persistent log 106, log service 108, data servers 110A-110N, replica data servers 112A-112N, data sets 114A-114N, replica data sets 116A-116N, data set snapshots 118A-118N, replica data set snapshots 120A-120N, database application 122, and/or snapshot service 124 of FIG. 1, replica data servers 404A and 404B, replica data sets 406A and 406B, snapshot service 424, validation manager 402, replica snapshots 408, 410, 412, and 414 and/or replica snapshots 416, 418, 420, and 422 of FIG. 4, validation manager 502 primary replica snapshots 504 and 506, IO unit reader 508, storage segment checker 510, cross-validator 512 and/or alert generator 518 of FIG. 5 and/or any of the components respectively described therein, and flowcharts 600, 700, and/or 800 may be implemented as hardware logic/electrical circuitry. In an embodiment, any of nodes 102 and 104A-104N, persistent log 106, log service 108, data servers 110A-110N, replica data servers 112A-112N, data sets 114A-114N, replica data sets 116A-116N, data set snapshots 118A-118N, replica data set snapshots 120A-120N, database application 122, and/or snapshot service 124 of FIG. 1, replica data servers 404A and 404B, replica data sets 406A and 406B, snapshot service 424, validation manager 402, replica snapshots 408, 410, 412, and 414 and/or replica snapshots 416, 418, 420, and 422 of FIG. 4, validation manager 502 primary replica snapshots 504 and 506, IO unit reader 508, storage segment checker 510, cross-validator 512 and/or alert generator 518 of FIG. 5 and/or any of the components respectively described therein, and flowcharts 600, 700, and/or 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
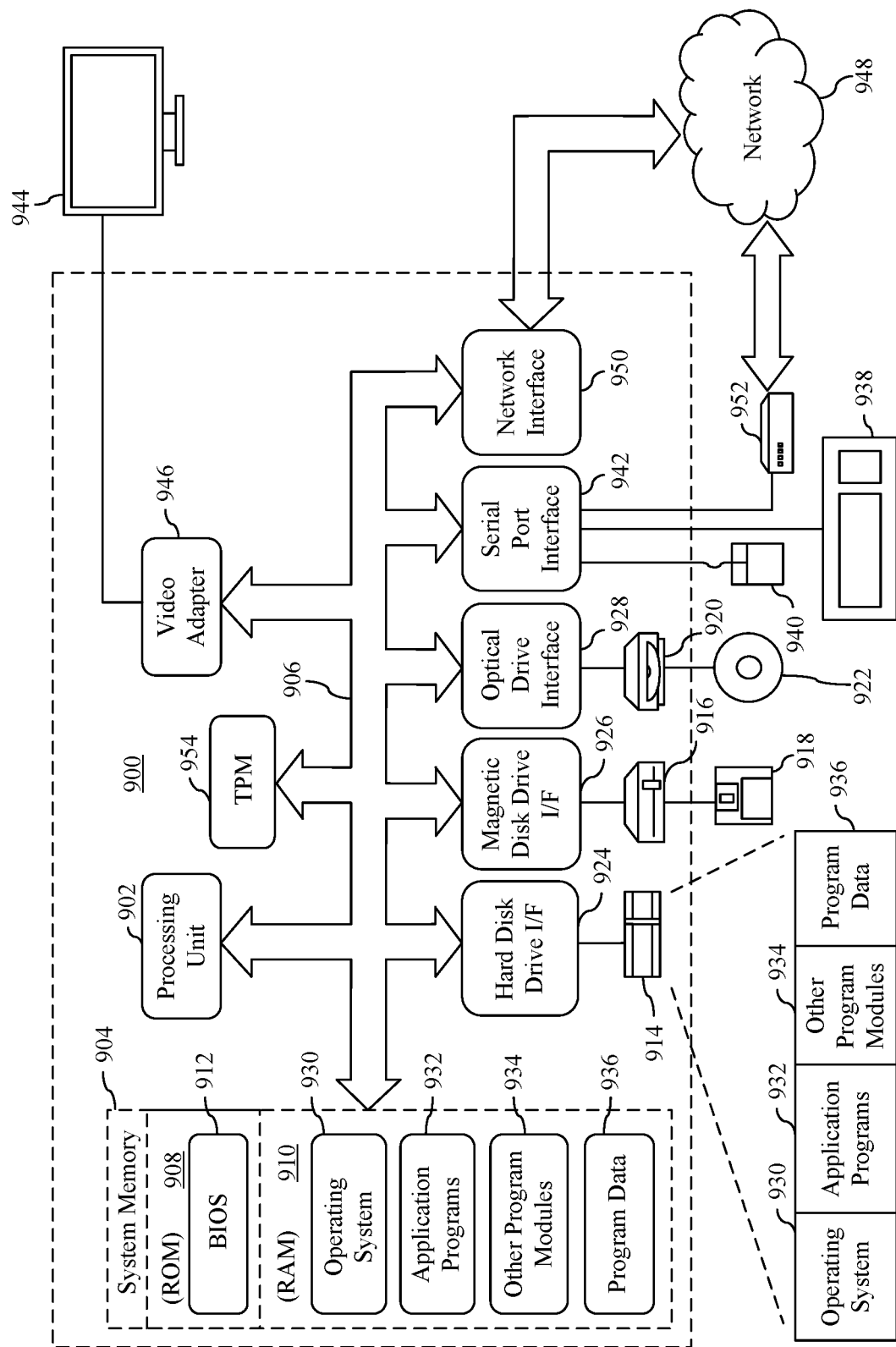
FIG. 9 is a block diagram of an example processor-based computer system that may be used to implement various embodiments.

FIG. 9 depicts an exemplary implementation of a computing device 900 in which embodiments may be implemented, including any of nodes 102 and 104A-104N, persistent log 106, log service 108, data servers 110A-110N, replica data servers 112A-112N, data sets 114A-114N, replica data sets 116A-116N, data set snapshots 118A-118N, replica data set snapshots 120A-120N, database application 122, and/or snapshot service 124 of FIG. 1, replica data servers 404A and 404B, replica data sets 406A and 406B, snapshot service 424, validation manager 402, replica snapshots 408, 410, 412, and 414 and/or replica snapshots 416, 418, 420, and 422 of FIG. 4, validation manager 502 primary replica snapshots 504 and 506, IO unit reader 508, storage segment checker 510, cross-validator 512 and/or alert generator 518 of FIG. 5 and/or any of the components respectively described therein, and flowcharts 600, 700, and/or 800. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the embodiments described above with reference to FIGS. 1-8.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, a virtual keyboard, by providing a tap input (where a user lightly presses and quickly releases display screen 944), by providing a "touch-and-hold" input (where a user touches and holds his finger (or touch instrument) on display screen 944 for a predetermined period of time), by providing touch input that exceeds a predetermined pressure threshold, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method is described herein. The method includes: determining a snapshot pair comprising a first snapshot of a first replica of a data set and a second snapshot of a second replica of the data set, the first replica comprising a plurality of first storage segments of the data set, and the second replica comprising a plurality of second storage segments of the data set; determining a minimum log sequence number from among a first log sequence number associated with the first snapshot and a second log sequence number associated with the second snapshot, the first log sequence number identifying a corresponding first log record that identifies a change to the data set that is not incorporated in the first snapshot, and the second log sequence number identifying a corresponding second log record that identifies a change to the data set that is not incorporated in the second snapshot; and for each first storage segment of the plurality of first storage segments: determining whether a third log sequence number that is lower than the minimum log sequence number and that is associated with the first storage segment matches a fourth log sequence number that is lower than the minimum log sequence number and that is associated with a second storage segment of the plurality of second storage segments that corresponds to the first storage segment; and in response to determining a mismatch between the third log sequence number and the fourth log sequence number, determining that a data corruption exists with respect to the data set.

In one implementation of the foregoing method, the method further comprises in response to determining that the third log sequence number and the fourth log sequence number match, determining that no data corruption exists with respect to the data set.

In one implementation of the foregoing method, determining the snapshot pair comprises determining a most-recently generated snapshot from a plurality of snapshots generated for the first replica, the most-recently generated snapshot comprising a first timestamp, the most-recently generated snapshot being the first snapshot of the snapshot pair; and determining a snapshot from a plurality of snapshots generated for the second replica that comprises a second timestamp that is closest to the first timestamp, the determined snapshot being the second snapshot of the snapshot pair.

In one implementation of the foregoing method, the method further comprises: for each first storage segment of the plurality of first storage segments: determining whether a first storage segment identifier associated with the first storage segment matches a second storage segment identifier associated with the second storage segment of the plurality of second storage segments corresponding to the first storage segment; in response to determining a mismatch between the first storage segment identifier and the second storage segment identifier, determining that a data corruption exists with respect to the data set; and in response to determining that the first storage segment identifier and the second storage segment identifier match, determining that no data corruption exists with respect to the data set.

In one implementation of the foregoing method, the third log sequence number identifies a corresponding first log record that identifies the latest modification made to the first storage segment, wherein the fourth log sequence number identifies a corresponding second log record that identifies the latest modification made to the second storage segment.

In one implementation of the foregoing method, the plurality of first storage segments correspond to a plurality of first pages of the data set, and wherein the plurality of second storage segments correspond to a plurality of second pages of the data set.

In one implementation of the foregoing method, the method further comprises in response to determining that a data corruption exists with respect to the data set, automatically generating an alert that indicates that the data corruption exists with respect to the data set.

A system in accordance with any of the embodiments described herein is also disclosed. The system includes: at least one processor circuit; and at least one memory that stores program code configured to be executed by the at least one processor circuit, the program code comprising: a validation manager configured to: determine a snapshot pair comprising a first snapshot of a first replica of a data set and a second snapshot of a second replica of the data set, the first replica comprising a plurality of first storage segments of the data set, and the second replica comprising a plurality of second storage segments of the data set; determine a minimum log sequence number from among a first log sequence number associated with the first snapshot and a second log sequence number associated with the second snapshot, the first log sequence number identifying a corresponding first log record that identifies a change to the data set that is not incorporated in the first snapshot, and the second log sequence number identifying a corresponding second log record that identifies a change to the data set that is not incorporated in the second snapshot; and for each first storage segment of the plurality of first storage segments: determine whether a third log sequence number that is lower than the minimum log sequence number and that is associated with the first storage segment matches a fourth log sequence number that is lower than the minimum log sequence number and that is associated with a second storage segment of the plurality of second storage segments that corresponds to the first storage segment; and in response to determining a mismatch between the third log sequence number and the fourth log sequence number, determine that a data corruption exists with respect to the data set.

In one implementation of the foregoing system, the validation manager further configured to: in response to determining that the third log sequence number and the fourth log sequence number match, determine that no data corruption exists with respect to the data set.

In one implementation of the foregoing system, the validation manager is configured to determine the snapshot pair by: determining a most-recently generated snapshot from a plurality of snapshots generated for the first replica, the most-recently generated snapshot comprising a first timestamp, the most-recently generated snapshot being the first snapshot of the snapshot pair; and determining a snapshot from a plurality of snapshots generated for the second replica that comprises a second timestamp that is closest to the first timestamp, the determined snapshot being the second snapshot of the snapshot pair.

In one implementation of the foregoing system, the validation manager further configured to: for each first storage segment of the plurality of first storage segments: determine whether a first storage segment identifier associated with the first storage segment matches a second storage segment identifier associated with the second storage segment of the plurality of second storage segments corresponding to the first storage segment; in response to determining a mismatch between the first storage segment identifier and the second storage segment identifier, determine that a data corruption exists with respect to the data set; and in response to determining that the first storage segment identifier and the second storage segment identifier match, determine that no data corruption exists with respect to the data set.

In one implementation of the foregoing system, the third log sequence number identifies a corresponding first log record that identifies the latest modification made to the first storage segment, wherein the fourth log sequence number identifies a corresponding second log record that identifies the latest modification made to the second storage segment.

In one implementation of the foregoing system, the plurality of first storage segments correspond to a plurality of first pages of the data set, and wherein the plurality of second storage segments correspond to a plurality of second pages of the data set.

In one implementation of the foregoing system, the validation manager further configured to: in response to determining that a data corruption exists with respect to the data set, automatically generate an alert that indicates that the data corruption exists with respect to the data set.

A computer-readable storage medium having program instructions recorded thereon that, when executed by at least one processor, perform a method. The method includes:

determining a snapshot pair comprising a first snapshot of a first replica of a data set and a second snapshot of a second replica of the data set, the first replica comprising a plurality of first storage segments of the data set, and the second replica comprising a plurality of second storage segments of the data set; determining a minimum log sequence number from among a first log sequence number associated with the first snapshot and a second log sequence number associated with the second snapshot, the first log sequence number identifying a corresponding first log record that identifies a change to the data set that is not incorporated in the first snapshot, and the second log sequence number identifying a corresponding second log record that identifies a change to the data set that is not incorporated in the second snapshot; and for each first storage segment of the plurality of first storage segments: determining whether a third log sequence number that is lower than the minimum log sequence number and that is associated with the first storage segment matches a fourth log sequence number that is lower than the minimum log sequence number and that is associated with a second storage segment of the plurality of second storage segments that corresponds to the first storage segment; and in response to determining a mismatch between the third log sequence number and the fourth log sequence number, determining that a data corruption exists with respect to the data set.

In one implementation of the foregoing computer-readable storage medium, the method further includes: in response to determining that the third log sequence number and the fourth log sequence number match, determining that no data corruption exists with respect to the data set.

In one implementation of the foregoing computer-readable storage medium, determining the snapshot pair comprises: determining a most-recently generated snapshot from a plurality of snapshots generated for the first replica, the most-recently generated snapshot comprising a first timestamp, the most-recently generated snapshot being the first snapshot of the snapshot pair; and determining a snapshot from a plurality of snapshots generated for the second replica that comprises a second timestamp that is closest to the first timestamp, the determined snapshot being the second snapshot of the snapshot pair.

In one implementation of the foregoing computer-readable storage medium, the method further comprises: for each first storage segment of the plurality of first storage segments: determining whether a first storage segment identifier associated with the first storage segment matches a second storage segment identifier associated with the second storage segment of the plurality of second storage segments corresponding to the first storage segment; in response to determining a mismatch between the first storage segment identifier and the second storage segment identifier, determining that a data corruption exists with respect to the data set; and in response to determining that the first storage segment identifier and the second storage segment identifier match, determining that no data corruption exists with respect to the data set.

In one implementation of the foregoing computer-readable storage medium, the third log sequence number identifies a corresponding first log record that identifies the latest modification made to the first storage segment, wherein the fourth log sequence number identifies a corresponding second log record that identifies the latest modification made to the second storage segment.

In one implementation of the foregoing computer-readable storage medium, the plurality of first storage segments correspond to a plurality of first pages of the data set, and wherein the plurality of second storage segments correspond to a plurality of second pages of the data set.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method, comprising:
   determining a snapshot pair comprising a first snapshot of a first replica of a data set and a second snapshot of a second replica of the data set, the first replica comprising a plurality of first storage segments of the data set, and the second replica comprising a plurality of second storage segments of the data set;
   identifying a log sequence number from among a first log sequence number associated with the first snapshot and a second log sequence number associated with the second snapshot;
   determining whether a third log sequence number that is lower than the identified log sequence number and that is associated with a first storage segment of the plurality of first storage segments matches a fourth log sequence number that is lower than the identified log sequence number and that is associated with a second storage segment of the plurality of second storage segments that corresponds to the first storage segment; and
   in response to determining a mismatch between the third log sequence number and the fourth log sequence number, determining that a data corruption exists with respect to the data set.

2. The method of claim 1, further comprising:
   in response to determining that the third log sequence number and the fourth log sequence number match, determining that no data corruption exists with respect to the data set.

3. The method of claim 1, wherein determining the snapshot pair comprises:
   determining a most-recently generated snapshot from a plurality of snapshots generated for the first replica, the most-recently generated snapshot comprising a first timestamp, the most-recently generated snapshot being the first snapshot of the snapshot pair; and
   determining a snapshot from a plurality of snapshots generated for the second replica that comprises a second timestamp that is closest to the first timestamp, the determined snapshot being the second snapshot of the snapshot pair.

4. The method of claim 1, further comprising:
   for each first storage segment of the plurality of first storage segments:
      determining whether a first storage segment identifier associated with the first storage segment matches a second storage segment identifier associated with the second storage segment of the plurality of second storage segments corresponding to the first storage segment;

in response to determining a mismatch between the first storage segment identifier and the second storage segment identifier, determining that a data corruption exists with respect to the data set; and in response to determining that the first storage segment identifier and the second storage segment identifier match, determining that no data corruption exists with respect to the data set.

5. The method of claim 1, wherein the first log sequence number identifies a corresponding first log record that identifies a change to the data set that is not incorporated in the first snapshot, and wherein the second log sequence number identifies a corresponding second log record that identifies a change to the data set that is not incorporated in the second snapshot.

6. The method of claim 1, wherein the third log sequence number identifies a corresponding first log record that identifies the latest modification made to the first storage segment, wherein the fourth log sequence number identifies a corresponding second log record that identifies the latest modification made to the second storage segment.

7. The method of claim 1, wherein the plurality of first storage segments correspond to a plurality of first pages of the data set, and wherein the plurality of second storage segments correspond to a plurality of second pages of the data set.

8. The method of claim 1, further comprising:
in response to determining that a data corruption exists with respect to the data set, automatically generating an alert that indicates that the data corruption exists with respect to the data set.

9. The method of claim 1, wherein identifying the log sequence number comprises determining a minimum from among the first log sequence number associated with the first snapshot and the second log sequence number associated with the second snapshot.

10. A system, comprising:
at least one processor circuit; and
at least one memory that stores program code configured to be executed by the at least one processor circuit, the program code comprising:
a validation manager configured to:
determine a snapshot pair comprising a first snapshot of a first replica of a data set and a second snapshot of a second replica of the data set, the first replica comprising a plurality of first storage segments of the data set, and the second replica comprising a plurality of second storage segments of the data set;
identify a log sequence number from among a first log sequence number associated with the first snapshot and a second log sequence number associated with the second snapshot;
determine whether a third log sequence number that is lower than the identified log sequence number and that is associated with a first storage segment of the plurality of first storage segments matches a fourth log sequence number that is lower than the identified log sequence number and that is associated with a second storage segment of the plurality of second storage segments that corresponds to the first storage segment; and
in response to determining a mismatch between the third log sequence number and the fourth log sequence number, determine that a data corruption exists with respect to the data set.

11. The system of claim 10, the validation manager further configured to:
in response to determining that the third log sequence number and the fourth log sequence number match, determine that no data corruption exists with respect to the data set.

12. The system of claim 10, wherein the validation manager is configured to determine the snapshot pair by:
determining a most-recently generated snapshot from a plurality of snapshots generated for the first replica, the most-recently generated snapshot comprising a first timestamp, the most-recently generated snapshot being the first snapshot of the snapshot pair; and
determining a snapshot from a plurality of snapshots generated for the second replica that comprises a second timestamp that is closest to the first timestamp, the determined snapshot being the second snapshot of the snapshot pair.

13. The system of claim 10, the validation manager configured to:
for each first storage segment of the plurality of first storage segments:
determine whether a first storage segment identifier associated with the first storage segment matches a second storage segment identifier associated with the second storage segment of the plurality of second storage segments corresponding to the first storage segment;
in response to determining a mismatch between the first storage segment identifier and the second storage segment identifier, determine that a data corruption exists with respect to the data set; and
in response to determining that the first storage segment identifier and the second storage segment identifier match, determine that no data corruption exists with respect to the data set.

14. The system of claim 10, wherein the first log sequence number identifies a corresponding first log record that identifies a change to the data set that is not incorporated in the first snapshot, and wherein the second log sequence number identifies a corresponding second log record that identifies a change to the data set that is not incorporated in the second snapshot.

15. The system of claim 10, wherein the third log sequence number identifies a corresponding first log record that identifies the latest modification made to the first storage segment, wherein the fourth log sequence number identifies a corresponding second log record that identifies the latest modification made to the second storage segment.

16. The system of claim 10, wherein the plurality of first storage segments correspond to a plurality of first pages of the data set, and wherein the plurality of second storage segments correspond to a plurality of second pages of the data set.

17. The system of claim 10, the program code further comprising an alert generator configured to:
in response to determining that a data corruption exists with respect to the data set, automatically generate an alert that indicates that the data corruption exists with respect to the data set.

18. A computer-readable storage medium having program instructions recorded thereon that, when executed by at least one processor of a computing device, perform a method, the method comprising:
determining a snapshot pair comprising a first snapshot of a first replica of a data set and a second snapshot of a second replica of the data set, the first replica comprising a plurality of first storage segments of the data set, and the second replica comprising a plurality of second storage segments of the data set;

identifying a log sequence number from among a first log sequence number associated with the first snapshot and a second log sequence number associated with the second snapshot;

determining whether a third log sequence number that is lower than the identified log sequence number and that is associated with a first storage segment of the plurality of first storage segments matches a fourth log sequence number that is lower than the identified log sequence number and that is associated with a second storage segment of the plurality of second storage segments that corresponds to the first storage segment; and in response to determining a mismatch between the third log sequence number and the fourth log sequence number, determining that a data corruption exists with respect to the data set.

19. The computer-readable storage medium of claim 18, the method further comprising:

in response to determining that the third log sequence number and the fourth log sequence number match, determining that no data corruption exists with respect to the data set.

20. The computer-readable storage medium of claim 18, wherein determining the snapshot pair comprises:

determining a most-recently generated snapshot from a plurality of snapshots generated for the first replica, the most-recently generated snapshot comprising a first timestamp, the most-recently generated snapshot being the first snapshot of the snapshot pair; and determining a snapshot from a plurality of snapshots generated for the second replica that comprises a second timestamp that is closest to the first timestamp, the determined snapshot being the second snapshot of the snapshot pair.

\* \* \* \* \*